United States Patent [19]
Yamamoto

[11] Patent Number: 6,044,716
[45] Date of Patent: Apr. 4, 2000

[54] FLUID PRESSURE DETECTOR AND AIR FLOW RATE MEASURING APPARATUS USING SAME

[75] Inventor: Yasuo Yamamoto, Tokyo, Japan

[73] Assignee: Wetmaster Co., Ltd., Tokyo, Japan

[21] Appl. No.: 09/173,715

[22] Filed: Oct. 16, 1998

[30] Foreign Application Priority Data

Oct. 16, 1997 [JP] Japan .................................. 9-297932
Oct. 16, 1997 [JP] Japan .................................. 9-297933
Oct. 16, 1997 [JP] Japan .................................. 9-297934

[51] Int. Cl.[7] .............................. G01F 1/46; G01L 13/02; G01L 7/00
[52] U.S. Cl. ............................ 73/861.66; 73/716; 73/756
[58] Field of Search ................................. 73/716, 861.65, 73/861.66, 147, 756

[56] References Cited

U.S. PATENT DOCUMENTS

| | | | |
|---|---|---|---|
| 3,765,241 | 10/1973 | Lambert | 63/212 |
| 4,297,900 | 11/1981 | Brandt, Jr. | 73/861.66 |
| 4,453,419 | 6/1984 | Engelke | 73/861.66 |
| 4,768,386 | 9/1988 | Taddeo | 73/861.66 |
| 4,791,814 | 12/1988 | Nee | 73/49.2 |
| 5,481,925 | 1/1996 | Woodbury | 73/861.66 |
| 5,753,825 | 5/1998 | Brandt, Jr. | 73/861.66 |
| 5,817,950 | 10/1998 | Wiklund et al. | 73/861.66 |

FOREIGN PATENT DOCUMENTS

| | | |
|---|---|---|
| 60-80316 | 6/1985 | Japan . |
| 60-135666 | 9/1985 | Japan . |
| 1-26010 | 5/1989 | Japan . |
| 3-220421 | 9/1991 | Japan . |

*Primary Examiner*—William Oen
*Assistant Examiner*—Abdullahi Aw-Musse
*Attorney, Agent, or Firm*—Burns, Doane, Swecker & Mathis, L.L.P.

[57] ABSTRACT

An air flow rate measuring apparatus includes a casing having opposite open ends, a flow rectifier mounted within the casing at an upstream-side portion thereof with respect to a direction of flow of fluid to be measured, and at least one fluid pressure detector which is mounted within the casing, and is disposed downstream of the flow rectifier, the fluid pressure detector including at least one differential pressure detector member. The differential pressure detector member includes a pair of tubular members of an identical configuration, and each of the tubular members has a flattened shape having opposed narrow side walls and opposed wide side walls, and at least one pressure-measuring port is formed through one of the opposed narrow side walls. The differential pressure detector member further includes a pair of plug members mounted on and closing opposite open ends of each of the tubular members, respectively, one of the pair of plug members having a pressure outlet port. The at least one pressure-measuring port in one of the pair of tubular members is directed toward an upstream side with respect to a direction of flow of fluid to be measured, thereby forming a total pressure-measuring port, while the at least one pressure-measuring port in the other tubular member is directed toward a downstream side, thereby forming a static pressure-measuring port.

23 Claims, 15 Drawing Sheets

FLUID PRESSURE DETECTOR AND AIR FLOW RATE MEASURING APPARATUS USING SAME

BACKGROUND OF THE INVENTION

This invention relates to a fluid pressure detector for measuring total pressure and static pressure of fluid flowing in a duct, and the invention also relates to an air flow rate measuring apparatus using this fluid pressure detector.

There is known a fluid pressure detector of the type in which a total pressure-measuring tube of a round (circular) cross-section and a static pressure-measuring tube of a round cross-section are connected together in parallel relation to each other, and a plurality of total pressure-measuring holes are formed in an upstream end of the total pressure-measuring tube, and a plurality of static pressure-measuring holes are formed in a downstream end of the static pressure-measuring tube. Such a fluid pressure detector is disclosed, for example, in Japanese Patent Unexamined Publication No. 3-220421 and Japanese Utility Model Unexamined Publication No. 60-135666.

In such a fluid pressure detector constituted by a combination of round measurement tubes, a pressure detection portion itself has poor ability to rectify or correct the flow, and it is difficult to detect the pressure in a stable manner, and particularly in the it is preferred that the flow should be rectified as much as possible at the total pressure-measuring position and the static pressure-measuring position.

In view of this, there has been proposed a fluid pressure detector (Japanese Patent Examined Publication No. 1-26010) which is formed into a generally-flattened shape. In this detector, a partition member is fixedly mounted within a flattened, hollow detector body, and is disposed perpendicular to a flow direction, thereby dividing the interior of this hollow body into two chambers, that is, an upstream-side chamber and a downstream-side chamber, and static pressure-detecting holes are formed in a direction perpendicular to the flow direction, and projections are provided downstream of the static pressure-detecting holes. Therefore, this detector has problems that the direction of mounting of a detector member is limited by the flow direction, and that a material, of which the detector is made, is limited because of its complicated construction, so that the use of this detector is limited.

There is known an air flow rate measuring apparatus of the type in which a flow rectifier is provided at an upstream-side portion of a casing, and a fluid pressure detector, such as a Pitot tube, is provided at a downstream-side portion of the casing (see Japanese Utility Model Unexamined Publication No. 60-80316). measurement under a deflection flow, an error is liable to occur in the detected pressure. Therefore, this fluid pressure detector is limited to a narrow range of use under a condition in which little deflection flow is involved. In the type of pressure detector in which projections are provided for the purpose of producing a stable eddy, the eddy is produced downstream of the projections over a wide range of flow velocity, and a constant pressure coefficient can be obtained regardless of a change in wind velocity (flow velocity). However, it has been proven that a constant pressure coefficient can be kept in a practical flow velocity range even without such projections. And besides, there is encountered a problem that an energy loss (pressure loss) of the fluid is increased because of the provision of the projections.

Furthermore, the power for conveying the fluid must be increased because of the increased energy loss, which results in a problem that a device, such as an air blower, must be increased in size, so that the running cost is increased.

A length of a mounting portion of the pressure detector is small in the direction of flow of the fluid, and therefore the pressure detector is liable to be mounted with an angle of attack relative to the flow, which results in a problem that an error in the detected pressure becomes large.

In the fluid pressure detector of this kind,

In the conventional air flow rate measuring apparatus, static pressure-measuring holes of the fluid pressure detector are formed in a direction perpendicular to the direction of flow of a fluid, and therefore it is required that the measurement should be carried out under a condition in which a stable flow with no eddy is present. Therefore, in order to avoid the influence of an eddy produced by the flow rectifier disposed at the upstream-side region, it is necessary to secure a sufficiently-long, straight tubular portion between the flow rectifier and the fluid pressure detector.

Generally, for the purpose of detecting a true static pressure in a flow passage, static pressure-measuring holes of a fluid pressure detector are formed in a direction perpendicular to the direction of flow of the fluid. Therefore, if a differential pressure detector is provided immediately after a flow rectifier as described above, there is encountered a great influence of an eddy produced immediately after the flow rectifier. This invites a problem that the measurement accuracy of the detected pressure is adversely affected.

In view of the foregoing, in a method of testing and inspecting an air blower according to Japanese Industrial Standards (JIS B 8330), the distance between a flow rectifier and a fluid pressure detector is larger than the bore (inner diameter) of a casing. This means that an air flow rate measuring apparatus, containing a flow rectifier therein, has an increased length in a direction of flow of fluid, which results in a problem that the apparatus is inevitably increased in size, so that a space, required for installing the apparatus, becomes large.

SUMMARY OF THE INVENTION

It is an object of the invention to provide a novel fluid pressure detector which can be produced at low costs by a simplified process, can have a wide range of use, can achieve a flow-rectifying effect, can reduce an energy loss caused by itself, can be prevented from being increased in size, and can reduce a running cost, and in which the direction of mounting of the detector is not limited by the direction of flow of fluid.

Another object of the invention is to provide a novel air flow rate measuring apparatus which is reduced in size particularly in a direction of flow of fluid so as to achieve a compact design of the apparatus, and has a reduced limitation on the mounting thereof in a duct, and can have a wide range of use.

According to one aspect of the present invention, there is provided a fluid pressure detector comprising at least one differential pressure detector member;

the differential pressure detector member comprising:

(a) a pair of tubular members of an identical configuration, each of the tubular members having a flattened shape having opposed narrow side walls and opposed wide side walls, and at least one pressure-measuring port being formed through one of the opposed narrow side walls; and (b) a pair of plug members mounted on and closing opposite open ends of each of the tubular members, respectively, one of the pair of plug members having a pressure outlet port;

wherein the pressure-measuring port in one of the pair of tubular members is directed toward an upstream side with respect to a direction of flow of fluid to be measured, thereby forming a total pressure-measuring port, while the pressure-measuring port in the other tubular member is directed toward a downstream side, thereby forming a static pressure-measuring port, and the pressure outlet port in the plug member, mounted on the one tubular member, serves as a total pressure outlet port while the pressure outlet port in the plug member, mounted on the other tubular member, serves as a static pressure outlet port.

Preferably, the narrow side wall, having the pressure-measuring port is rounded.

The pair of tubular members are juxtaposed in contact with each other, or are juxtaposed in closely-spaced relation to each other.

In one preferred form of the invention, there are provided a plurality of differential pressure detector members juxtaposed in a direction substantially perpendicular to the direction of flow of the fluid, and in this case the total pressure outlet ports, provided respectively in the plurality of differential pressure detector members, may communicate with each other through a total pressure communication tube while the static pressure outlet ports, provided respectively in the plurality of differential pressure detector members, may communicate with each other through a static pressure communication tube.

In another preferred form of the invention, there are provided a plurality of the differential pressure detector members arranged in a radial manner and disposed substantially perpendicular to the direction of flow of the fluid, and the total pressure outlet ports, provided respectively in the plurality of differential pressure detector members, may communicate with each other through a total pressure communication tube provided at a center of the radial arrangement, while the static pressure outlet ports, provided respectively in the plurality of differential pressure detector members, may communicate with each other through a static pressure communication tube provided at the center of the radial arrangement.

According to another aspect of the invention, there is provided an air flow rate measuring apparatus comprising:

a casing having opposite open ends;

a flow rectifier mounted within the casing at an upstream-side portion thereof with respect to a direction of flow of fluid to be measured; and at least one fluid pressure detector which is mounted within the casing, and is disposed downstream of the flow rectifier, the fluid pressure detector comprising at least one differential pressure detector member;

the differential pressure detector member comprising:

(a) a pair of tubular members of an identical configuration, each of the tubular members having a flattened shape having opposed narrow side walls and opposed wide side walls, and at least one pressure-measuring port being formed through one of the opposed narrow side walls; and (b) a pair of plug members mounted on and closing opposite open ends of each of the tubular members, respectively, one of the pair of plug members having a pressure outlet port;

wherein the pressure-measuring port in one of the pair of tubular members is directed toward an upstream side with respect to a direction of flow of fluid to be measured, thereby forming a total pressure-measuring port, while the pressure-measuring port in the other tubular member is directed toward a downstream side, thereby forming a static pressure-measuring port, and the pressure outlet port in the plug member, mounted on the one tubular member, serves as a total pressure outlet port while the pressure outlet port in the plug member, mounted on the other tubular member, serves as a static pressure outlet port.

DESCRIPTION OF THE PREFERRED EMBODIMENTS

Figure 1:
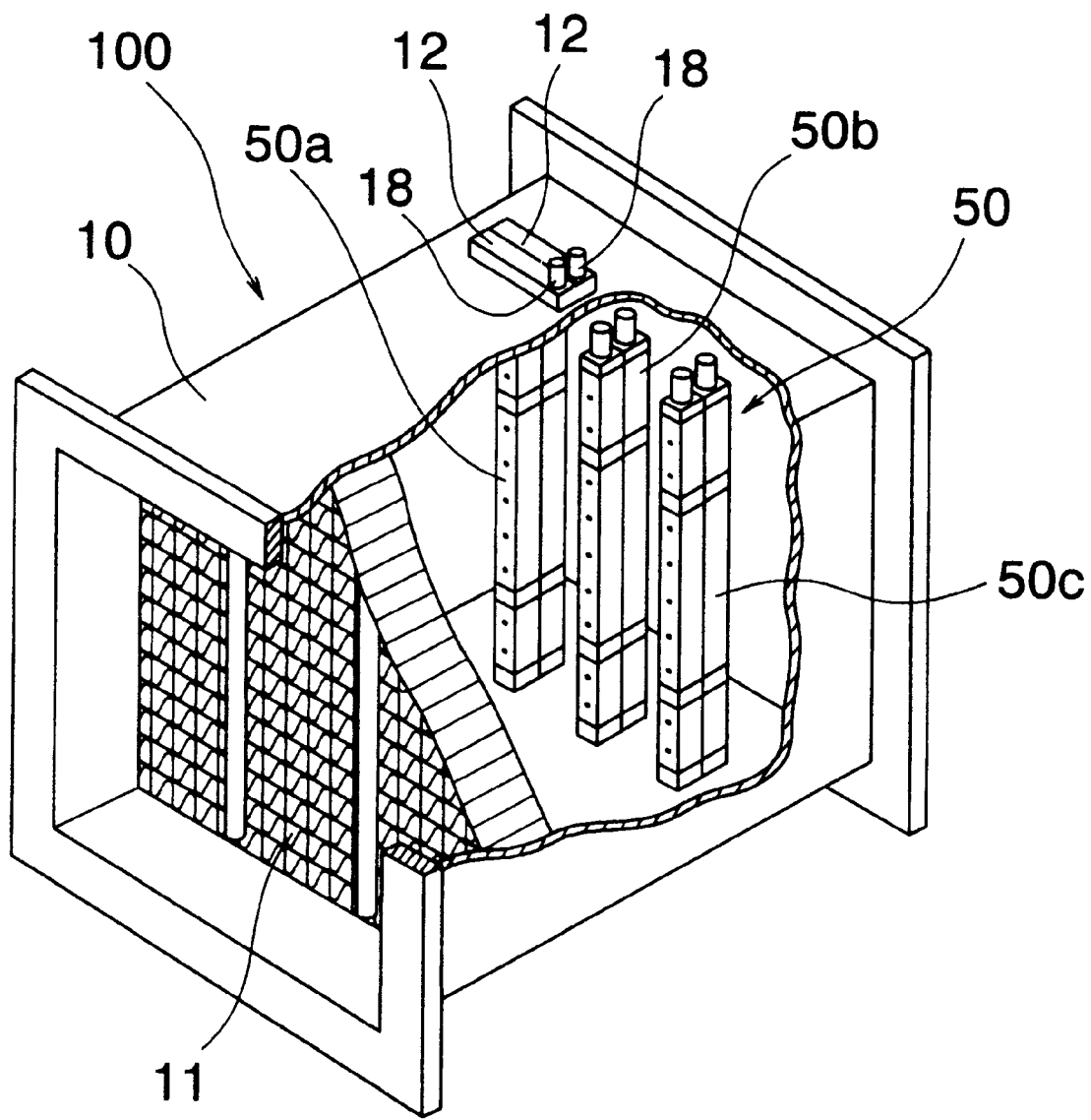
FIG. 1 is a partly-broken, perspective view of a first embodiment of an air flow rate measuring apparatus according to the invention.

An air flow rate measuring apparatus and a fluid pressure detector according to a first embodiment of the present invention will now be described with reference to FIGS. 1 to 4. The air flow rate measuring apparatus 100 comprises a casing 10 of a square cross-section having opposite open ends, a flow rectifier 11 mounted within the casing 10 at an upstream-side portion thereof with respect to a direction of flow of fluid to be measured, and the fluid pressure detector 50 which is mounted within the casing 10, and is disposed downstream of the flow rectifier 11.

The flow rectifier 11 has a honeycomb-like laminated structure comprising flat plates and corrugated plates alternately stacked together. However, the flow rectifier may have a mesh structure, or may have a honeycomb structure. Preferably, the flow rectifier is made of stainless steel so as to withstand various environments.

The fluid pressure detector 50 comprises three differential pressure detector members 50a, 50b and 50c juxtaposed in a direction perpendicular to the direction of flow of the fluid. Each of these differential pressure detector members includes a pair of tubular members 1 of an identical configuration. The tubular member 1 has a generally rectangular cross-section, and has opposed wide side walls 2 and opposed narrow side walls 5. At least one pressure-measuring port 7 is formed through one of the narrow side walls 5 of the tubular member 1, and communicates with the interior (internal space) of the tubular member 1. The pair of tubular members 1 are juxtaposed in contact with each other, with their pressure-measuring ports 7 facing away from each other, and the pair of tubular members 1 are mounted within the casing 10 in such a manner that the pressure-measuring ports 7 in one of the two tubular members 1 are directed toward the upstream side with respect to the direction of flow of the fluid while the pressure-measuring ports 7 in the other tubular member 1 are directed toward the downstream side. With this arrangement, the upstream-directed pressure-measuring ports 7 serve as total pressure-measuring ports while the downstream-directed pressure-measuring ports 7 serve as static pressure-measuring ports.

A plug member 4 is press-fitted, together with a seal member, in each of opposite open ends of the tubular member 1, and is bonded thereto. Thus, the two plug members 4 close the opposite open ends, respectively, thereby forming a pressure chamber 3 within the tubular member 1. The pressure chamber 3, communicating with the total pressure-measuring ports 7, serves as a total pressure chamber while the pressure chamber 3, communicating with the static pressure-measuring ports 7, serves as a static pressure-measuring chamber. A pressure outlet port 6 is formed in one of the two plug members 4 mounted on each tubular member 1, and communicates with the pressure chamber 3. The pressure outlet port 6 is projecting outwardly from the casing 10. Each of the plug members 4 is fixedly secured to the casing 10 by screws 14, and with this construction, the differential pressure detector members 50a, 50b and 50c are fixed to the casing 10.

The three pressure outlet ports 6, communicating respectively with the total pressure chambers, communicate with one another by a single total pressure communication tube 12. The three pressure outlet ports 6, communicating respectively with the static pressure chambers, communicate with one another by a single static pressure communication tube 12. A mean (average) pressure outlet port 18 is formed in each of the total pressure communication tube 12 and the static pressure communication tube 12. With this construction, the mean total pressure and the mean static pressure can be obtained, and therefore the mean differential pressure can be obtained.

A cover 13, having a flange, is fitted on each of the communication tubes 12. The cover 13 is fixedly secured, together with the associated plug members 4, to the casing 10 by the above-mentioned screws 14, and therefore the cover 13 fixes the communication tube 12.

Figure 5:
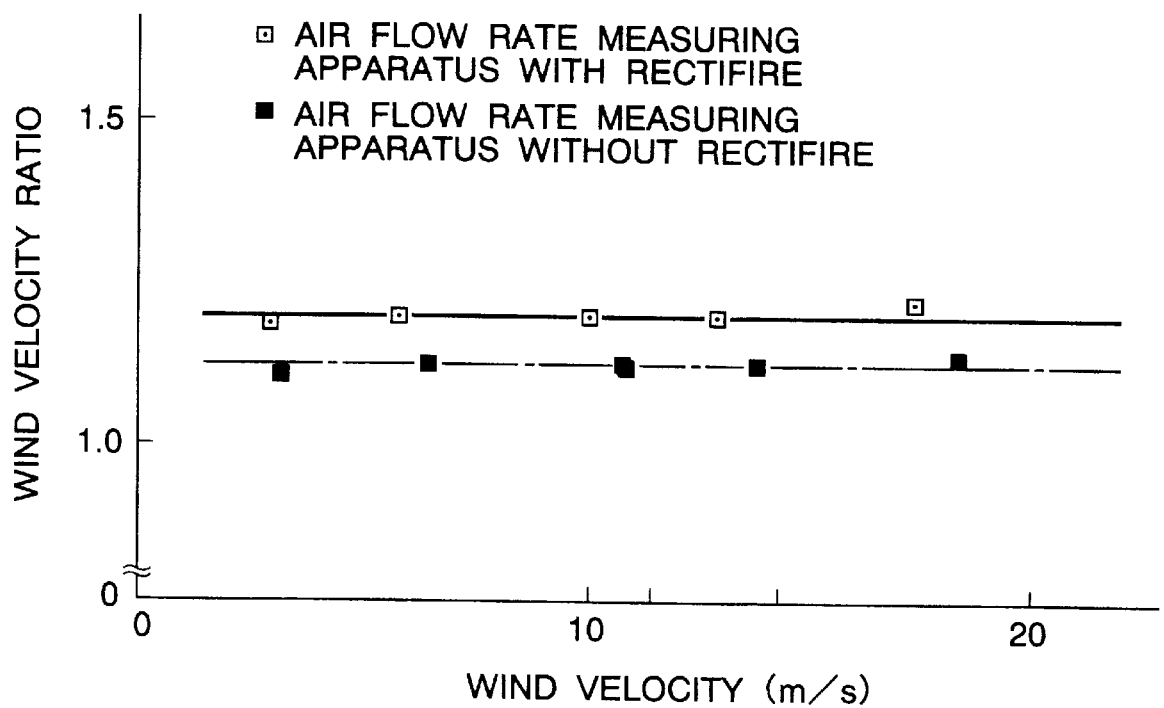
FIG. 5 is a graph showing results of a performance test of the first embodiment of the air flow rate measuring apparatus.

FIG. 5 shows results of a performance test of this embodiment. In this performance test, a duct of a square cross-section (whose one side was 40 mm) was used, and the apparatus with the flow rectifier and the apparatus without the flow rectifier were tested. In this graph, a wind velocity (flow velocity) ratio represents a ratio relative to an indicated value, obtained in the measurement by a Pitot tube, that is, a true wind velocity, and the unit is magnification, and this is represented in terms of a factor (for example, 1.5 times the true wind velocity). As will be appreciated from this graph, the wind velocity in the duct could be measured stably over a wide flow velocity range from a low speed to a high speed.

The above fluid pressure detector of the present invention has a flattened outer configuration, and therefore the detector itself performs a flow-rectifying effect to rectify the direction of flow of the fluid, thereby reducing a pressure loss. The static pressure-measuring ports are disposed at the most downstream end, and therefore the apparent static pressure, lower than the true static pressure, is obtained because of the presence of eddies formed by the fluid pressure detector, so that the differential pressure (apparent dynamic pressure) between the total pressure and the apparent static pressure is larger than the true dynamic pressure. Therefore, particularly in a low flow velocity range in which the dynamic pressure is small, the rate of an error in the reading of the apparent dynamic pressure by an pressure indicator can be estimated as being smaller as compared with an apparatus for measuring the true dynamic pressure, and this further enhances the measurement accuracy in cooperation with the above self-rectifying effect. And besides, the flattened pressure detector is fixed at their opposite ends to the casing, and therefore the length of mounting of the pressure detector on the casing can be made larger as compared with the conventional apparatus, so that tolerance can be made larger.

Figure 2:
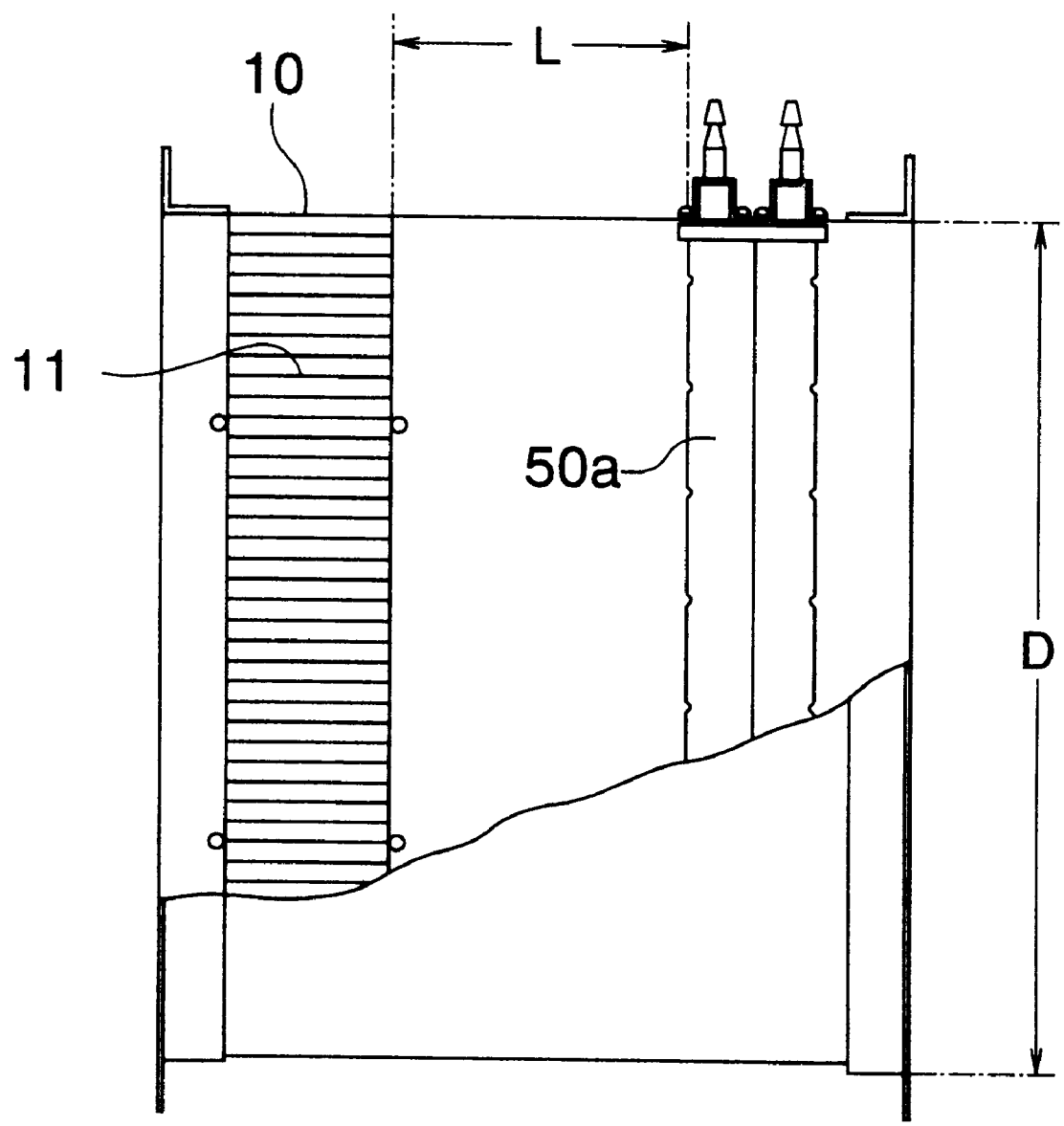
FIG. 2 is a partly-broken, side-elevational view of the air flow rate measuring apparatus of the first embodiment.
Figure 3:
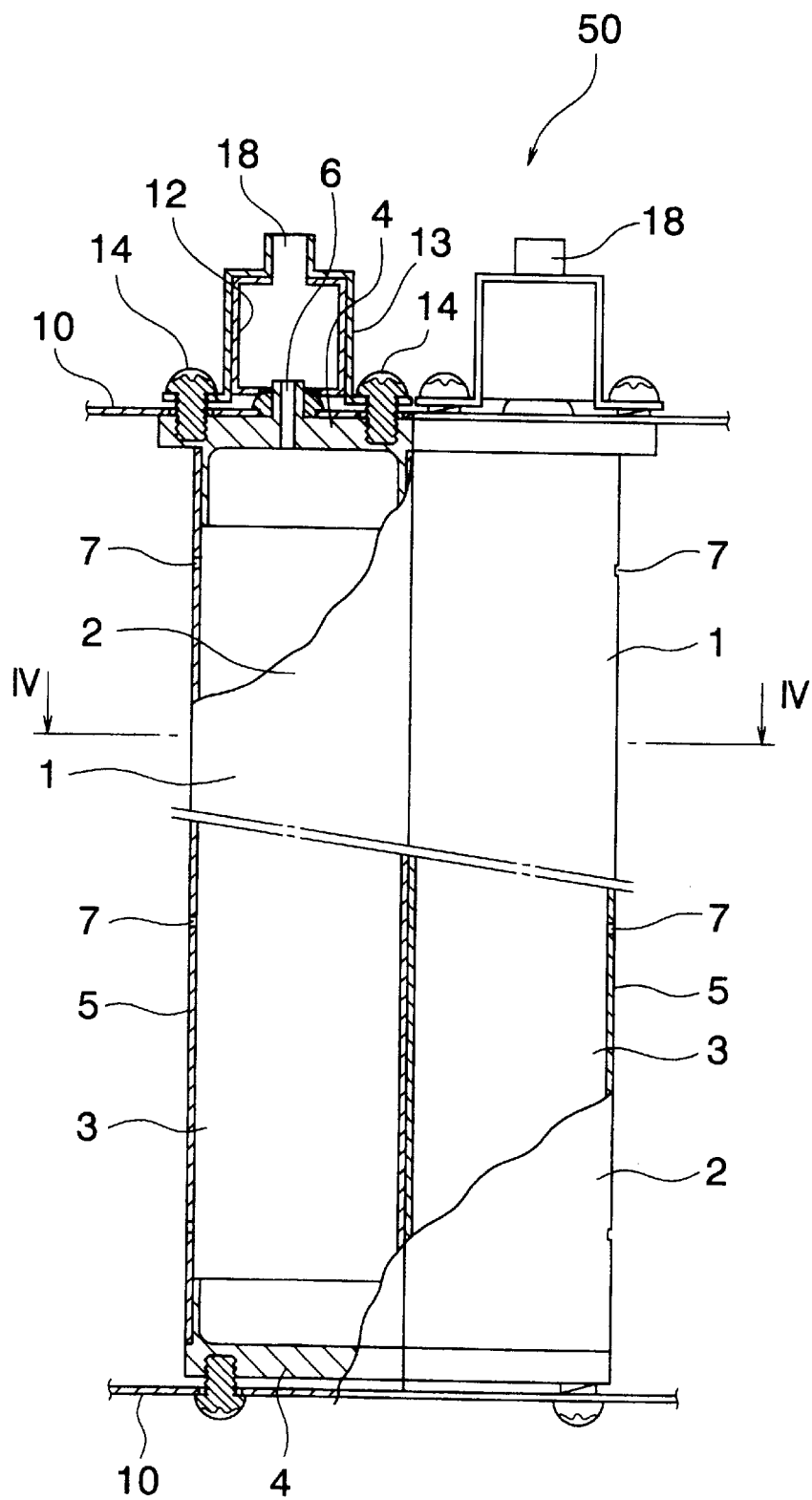
FIG. 3 is partly cross-sectional, side-elevational view of a first embodiment of a fluid pressure detector of the invention.
Figure 4:
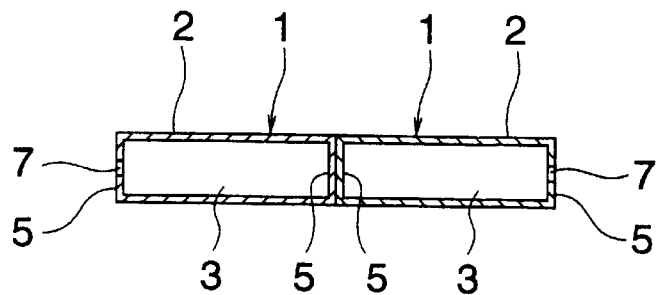
FIG. 4 is a cross-sectional view taken along the line IV—IV in FIG. 3.

In the apparatus of the present invention, the fluid pressure detector is constituted by the hollow members flattened in the direction of flow of the fluid, and the static pressure-measuring ports are directed toward the downstream side, and the pressure is detected within the eddies induced by the fluid pressure detector itself. Therefore, the detection of the pressure is less affected by eddies formed after the flow rectifier, and therefore the distance between the fluid pressure detector and the flow rectifier can be reduced. Namely, as shown in FIG. 2, the distance L between the flow rectifier and the fluid pressure detector can be made smaller than the bore (internal dimension) D of the casing (L<D), and therefore this ratio of L:D can be made smaller as compared with provisions of the abovementioned JIS.

The tubular member 1 can be obtained by press working a drawn pipe. Alternatively, the tubular member 1 may be obtained by cutting a square pipe into a predetermined length. In the fluid pressure detector of this embodiment, although the pair of tubular members 1 of each differential pressure detector member are juxtaposed to each other in such a manner that their narrow side walls, each having no pressure-measuring port, are held in contact with each other, the pair of tubular members can be formed as an integral structural member by extrusion.

The plug member 4 is press-fitted, together with the seal member, in each of the opposite open ends of the tubular member 1, and is bonded thereto. Thus, the two plug members 4 close the opposite open ends, respectively, thereby forming the pressure chamber 3 within the tubular member 1. Therefore, welding is not needed, and the differential pressure detector can be produced easily.

The pair of tubular members 1 have the identical configuration, and therefore in the manufacture of the fluid pressure detector, there is no difference between the upstream-side tubular member and the downstream-side tubular member, and the production management is easy. And besides, in the assembling operation, the erroneous assembling can be eliminated.

In this embodiment, although the fluid pressure detector 50 comprises the three differential pressure detector members 50a, 50b and 50c, the detector 50 may comprise only one differential pressure detector member or more than three.

Figure 6:
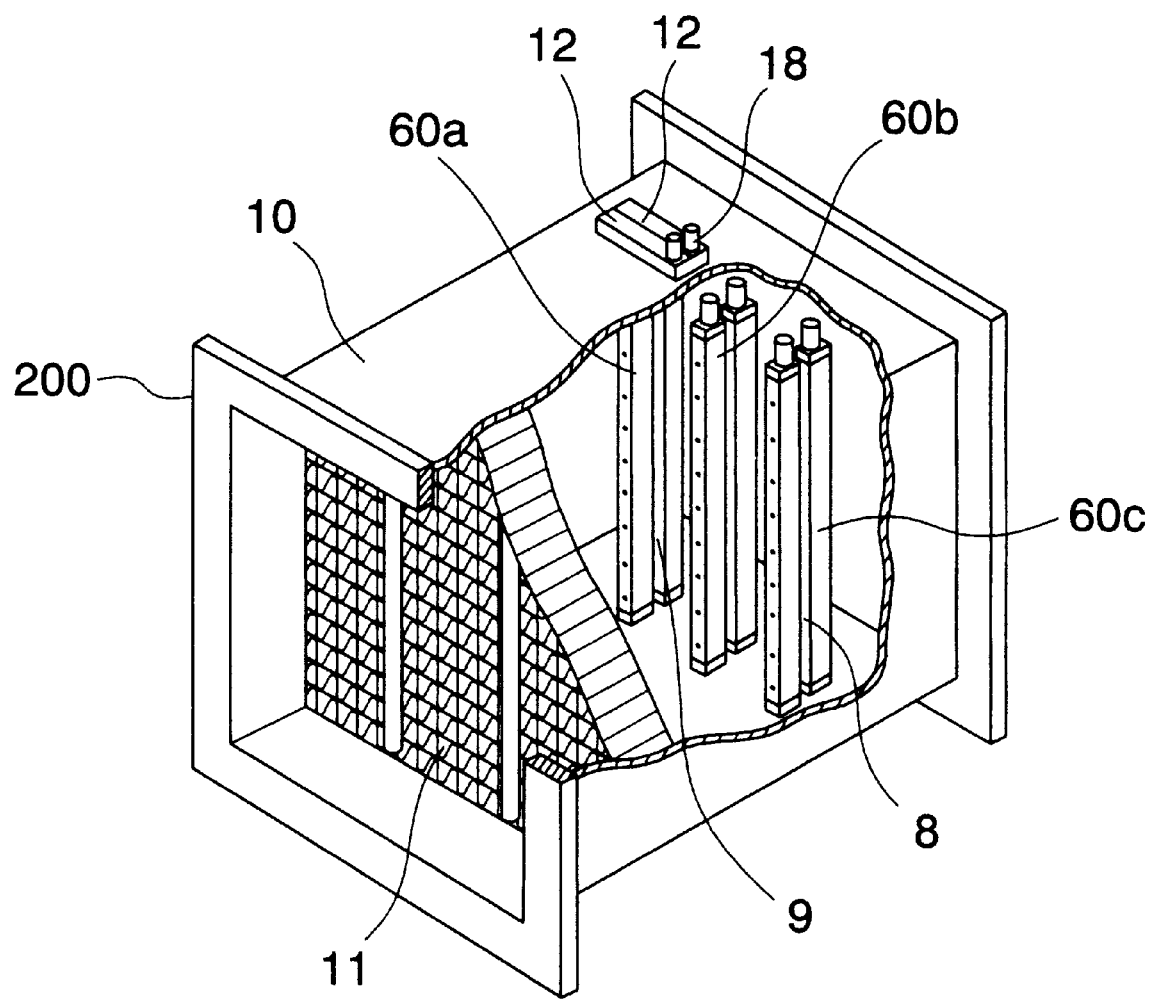
FIG. 6 is a partly-broken, perspective view of a second embodiment of an air flow rate measuring apparatus according to the invention.
Figure 7:
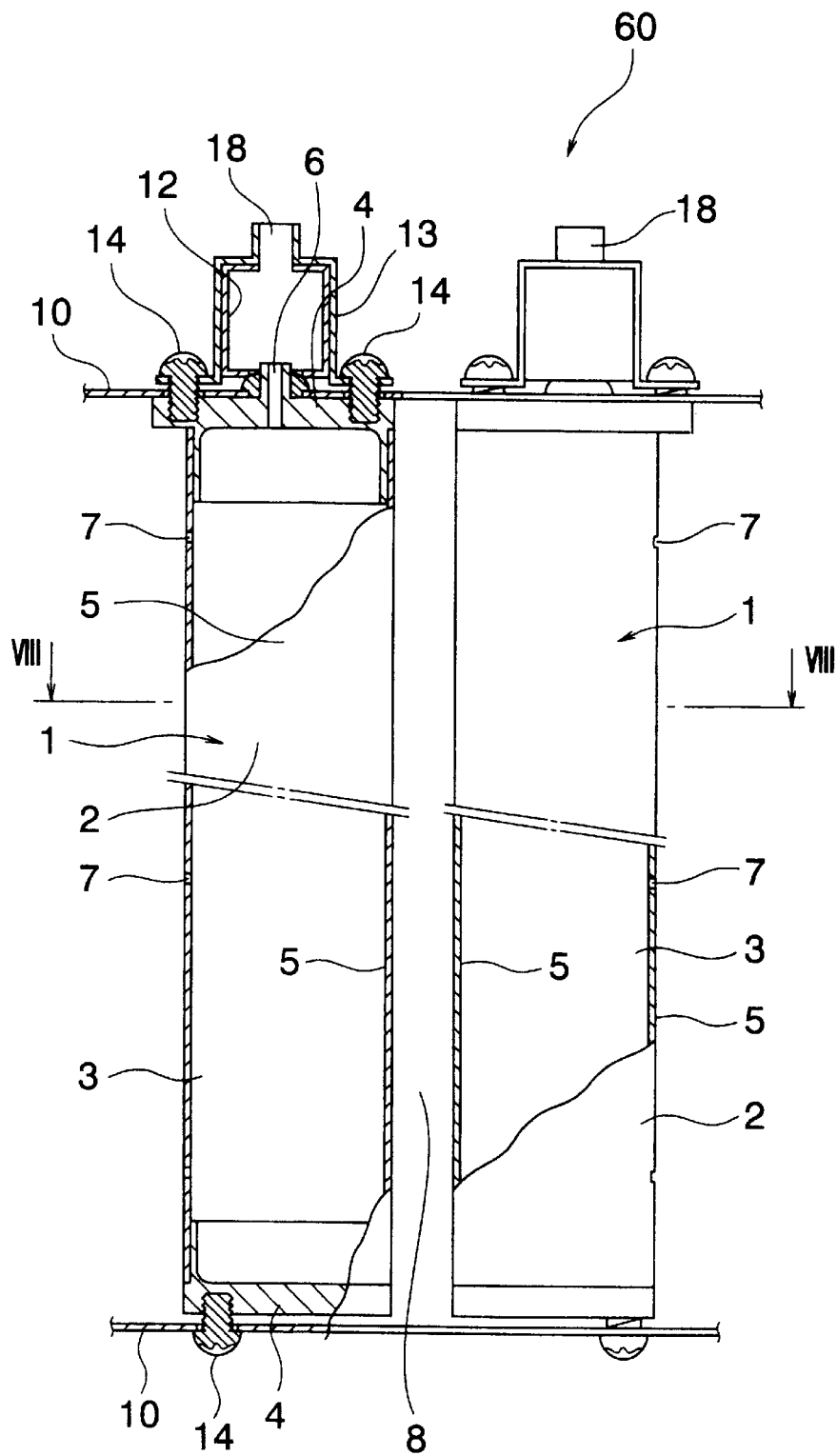
FIG. 7 is partly cross-sectional, side-elevational view of the second embodiment of a fluid pressure detector.
Figure 8:
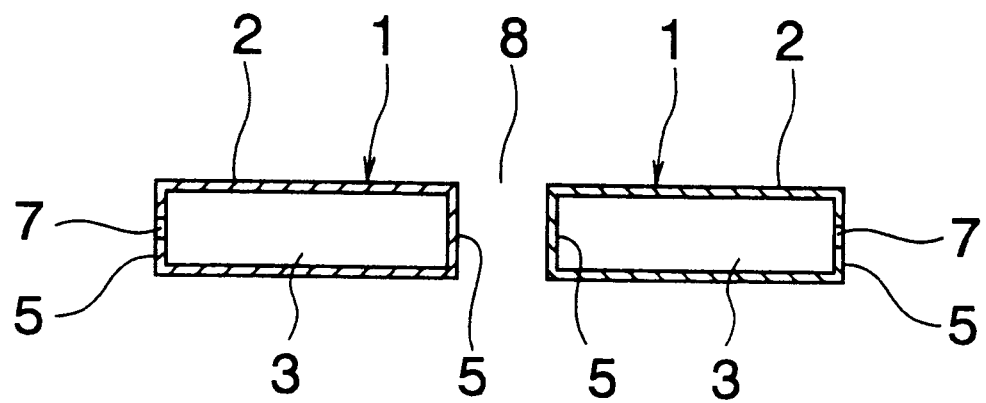
FIG. 8 is a cross-sectional view taken along the line VIII—VIII in FIG. 7.

Next, an air flow rate measuring apparatus and a fluid pressure detector according to a second embodiment of the invention will be described with reference to FIGS. 6 to 8. This second embodiment differs from the first embodiment in that a pair of tubular members 1 of each of differential pressure detector members 60a, 60b and 60c are disposed in parallel, closely spaced relation to each other, with a small gap 8 formed therebetween.

In the fluid pressure detector 60 in which the pair of tubular members 1 of each differential pressure detector member are disposed parallel to each other, with the gap 8 formed therebetween, the directivity in the flow direction can be reduced, and the yawing property for an angle of attack can be enhanced. In conjunction with the effect achieved by the fact that a flow rectifier 11 is provided upstream of the fluid pressure detector, the apparatus can be one in which an error is less liable to occur in the detected pressure even under conditions in which a considerable deflection flow is encountered, and the direction of the flow is not stable and not steady.

Figure 9:
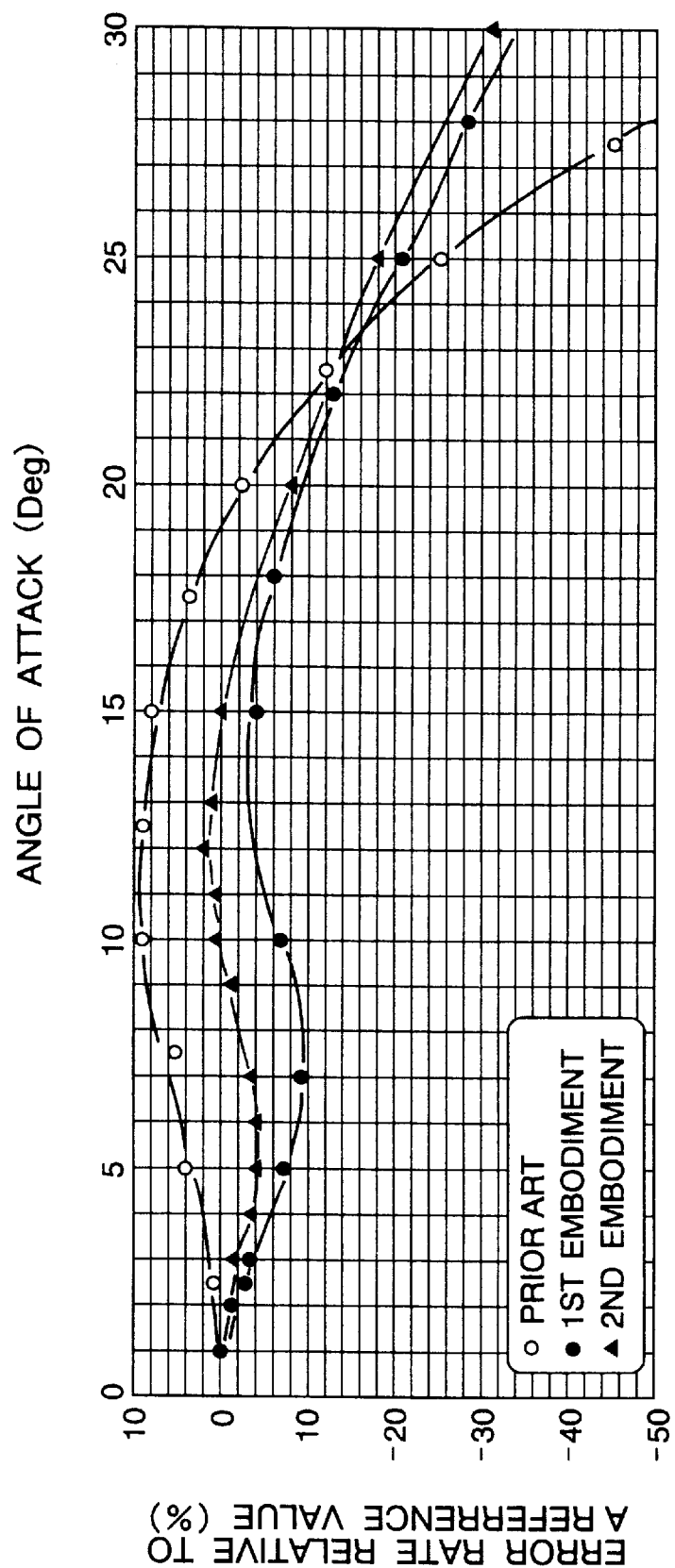
FIG. 9 is a graph showing results of a comparative performance test for the air flow rate measuring apparatuses of the first and second embodiments of the invention and a conventional air flow rate measuring apparatus.

FIG. 9 show results of a comparative test for the air flow rate measuring apparatuses 100 and 200 of the first and second embodiments of the invention and a conventional air flow rate measuring apparatus. A casing, used in the test, had an internal opening of a rectangular cross-section (200 mm×300 mm), and the wind velocity was 11 m/sec., and the gap 8 between the pair of tubular members 1 was 2 mm. As will be appreciated from FIG. 9, in the apparatus 200 of the second embodiment, an error rate of the yawing property for the attack angle relative to a reference value is better at the yawing angle of 0 to 18 degrees as compared with the other apparatuses.

Figure 10:
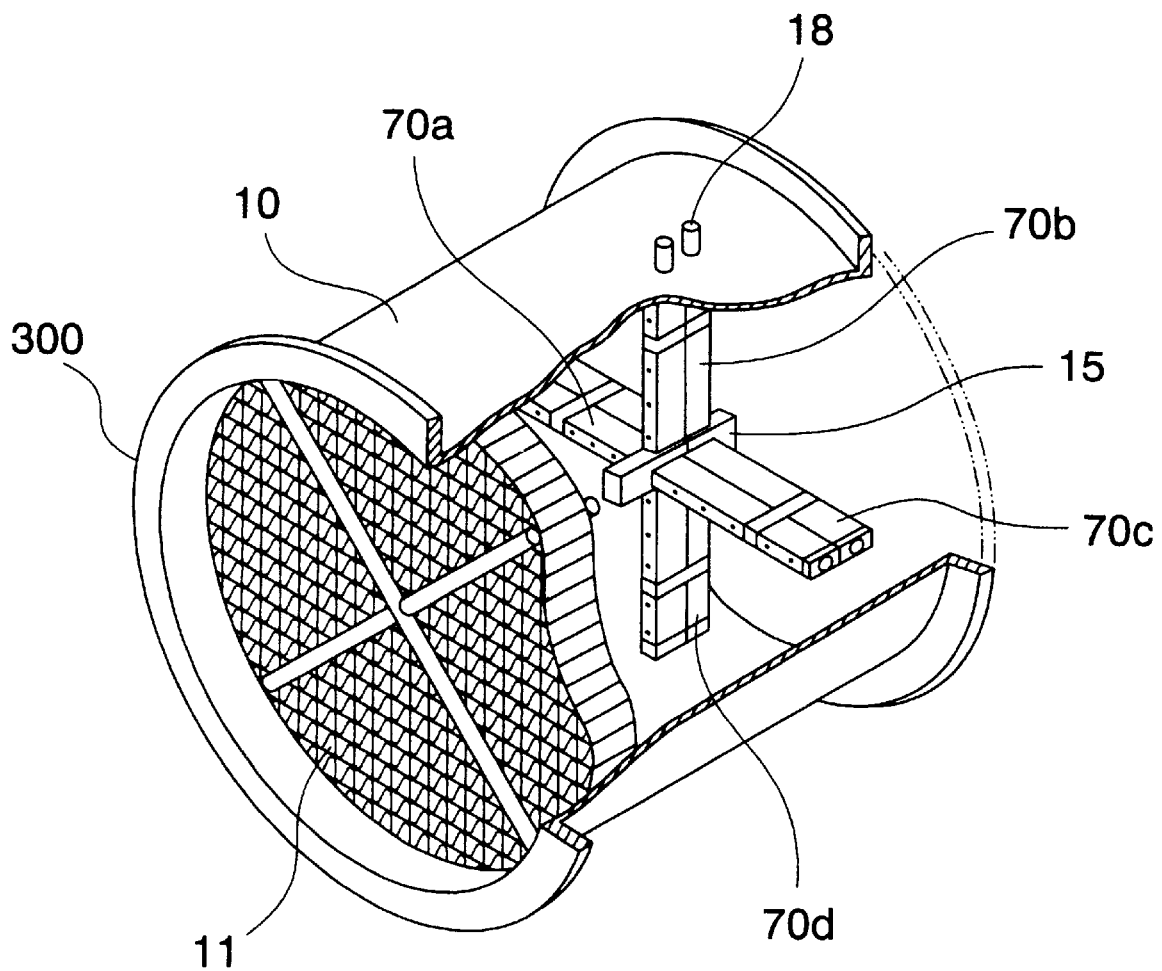
FIG. 10 is a partly-broken, perspective view of a third embodiment of an air flow rate measuring apparatus according to the invention.
Figure 11:
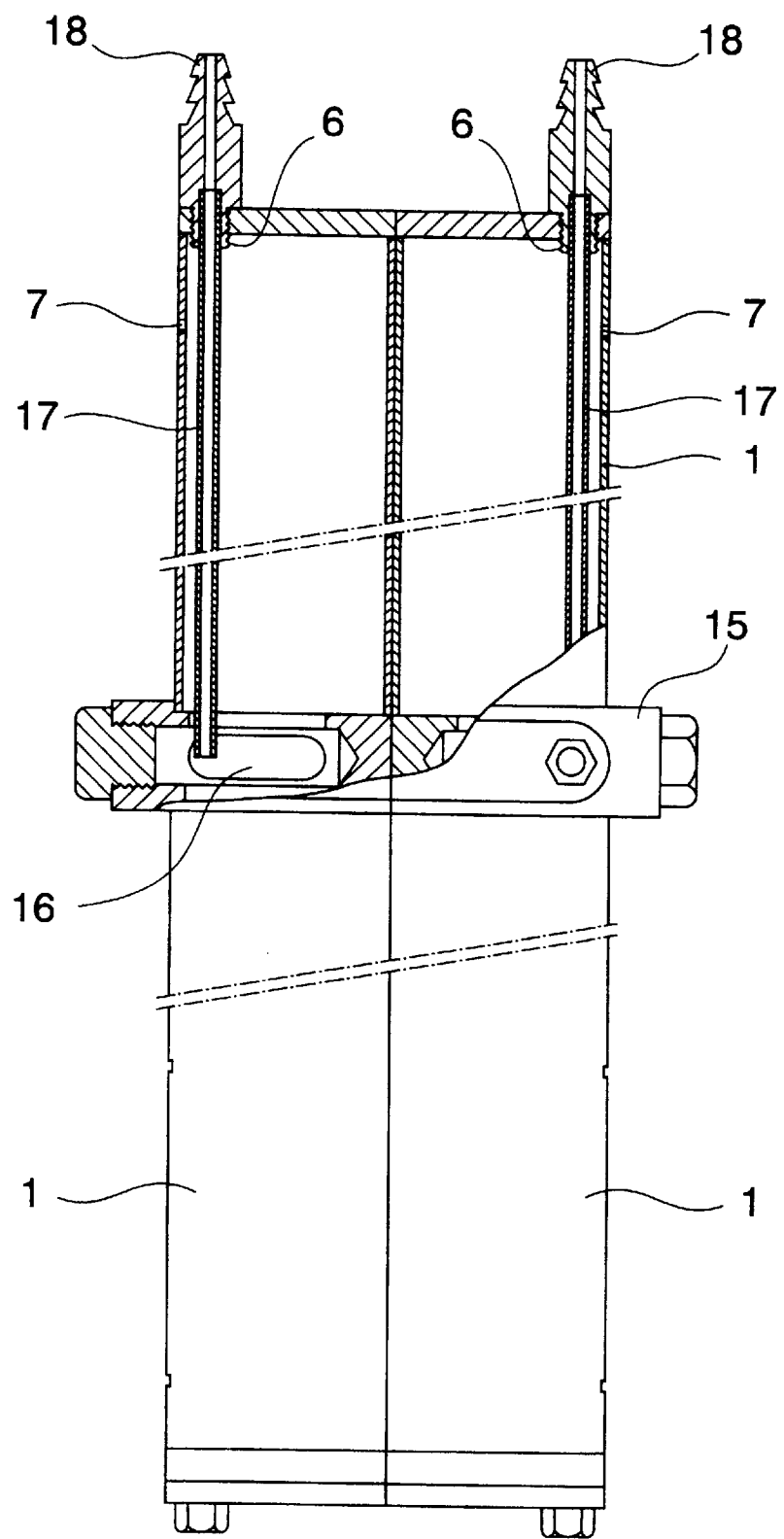
FIG. 11 is partly cross-sectional, side-elevational view of the third embodiment of a fluid pressure detector.
Figure 12:
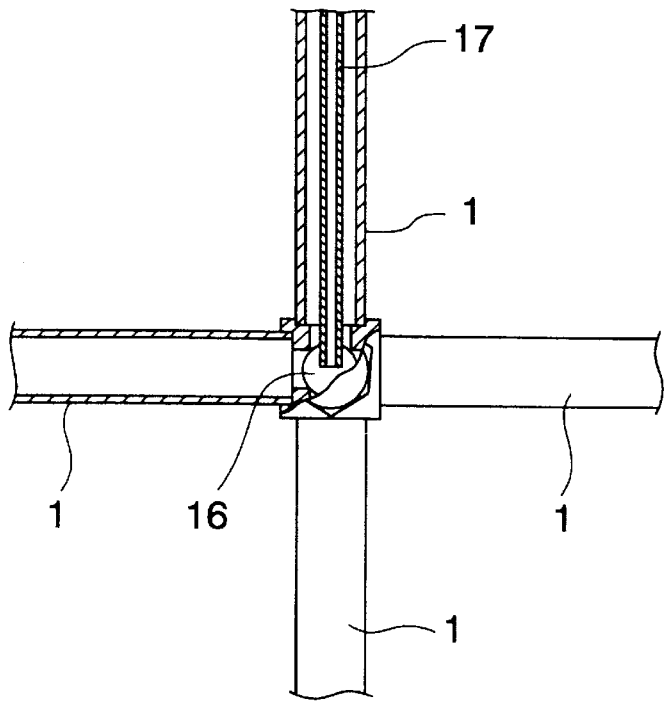
FIG. 12 is a partly cross-sectional, front-elevational view of the third embodiment of the fluid pressure detector.

Next, an air flow rate measuring apparatus and a fluid pressure detector according to a third embodiment of the invention will be described with reference to FIGS. 10 to 12.

The air flow rate measuring apparatus 300 comprises a casing 10 of a round cross-section having opposite open ends, a flow rectifier 11 mounted within the casing 10 at an upstream-side portion thereof with respect to a direction of flow of fluid to be measured, and the fluid pressure detector 70 which is mounted within the casing 10, and is disposed downstream of the flow rectifier 11.

As described above for the first and second embodiments, the flow rectifier 11 has a honeycomb-like laminated structure comprising flat plates and corrugated plates alternately stacked together. However, the flow rectifier may have a mesh structure, or may have a honeycomb structure.

The fluid pressure detector 70 comprises four differential pressure detector members 70a, 70b, 70c and 70d arranged in a radial manner (cross-shaped manner) and disposed perpendicular to the direction of flow of the fluid, and a sensor socket 15 which is disposed at the center of this radial arrangement and into which the four differential pressure detector members 70a to 70d are fitted. As described above for the first and second embodiments, each of the differential pressure detector members 70a to 70d includes a pair of tubular members 1 of an identical configuration. The pair of tubular members 1 are juxtaposed in contact with each other, with their pressure-measuring ports 7 facing away from each other, and the pair of tubular members 1 are mounted within the casing 10 in such a manner that the pressure-measuring ports 7 in one of the two tubular members 1 are directed toward the upstream side with respect to the direction of flow of the fluid while the pressure-measuring ports 7 in the other tubular member 1 are directed toward the downstream side. With this construction, the upstream-directed pressure-measuring ports 7 serve as total pressure-measuring ports while the downstream-directed pressure-measuring ports 7 serve as static pressure-measuring ports.

Two hollow portions 16 are formed within the sensor socket 15, and total pressure chambers of the differential pressure detector members 70a to 70d communicate with one of the hollow portions 16 while static pressure chambers of the differential pressure detector members 70a to 70d communicate with the other hollow portion 16. A total pressure outlet port 6, formed in one of the four differential pressure detector members 70a to 70d, communicates with the hollow portion 16, communicating with the total pressure chambers, through a communication tube 17, and a static pressure outlet port 6, formed in this differential pressure detector member, communicates with the other hollow portion 16, communicating with the static pressure chambers, through another communication tube 17. With this construction, the mean total pressure and the mean static pressure of the four differential pressure detector members can be obtained, and therefore the mean differential pressure can be obtained.

Figure 13:
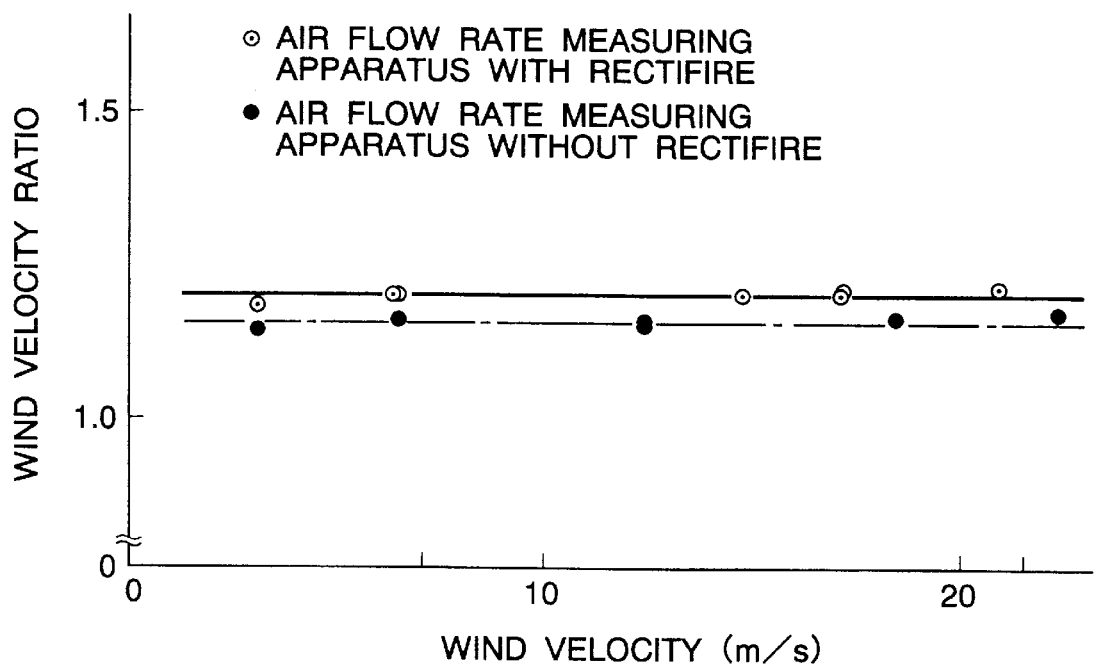
FIG. 13 is a graph showing results of a performance test of the third embodiment of the air flow rate measuring apparatus.

FIG. 13 shows results of a performance test of this embodiment. In this performance test, a duct, having a bore (inner diameter) of 412 mm, was used. As will be appreciated from FIG. 13, a constant wind velocity ratio is obtained over a wide flow velocity range as in the first and second embodiments.

Figure 14:
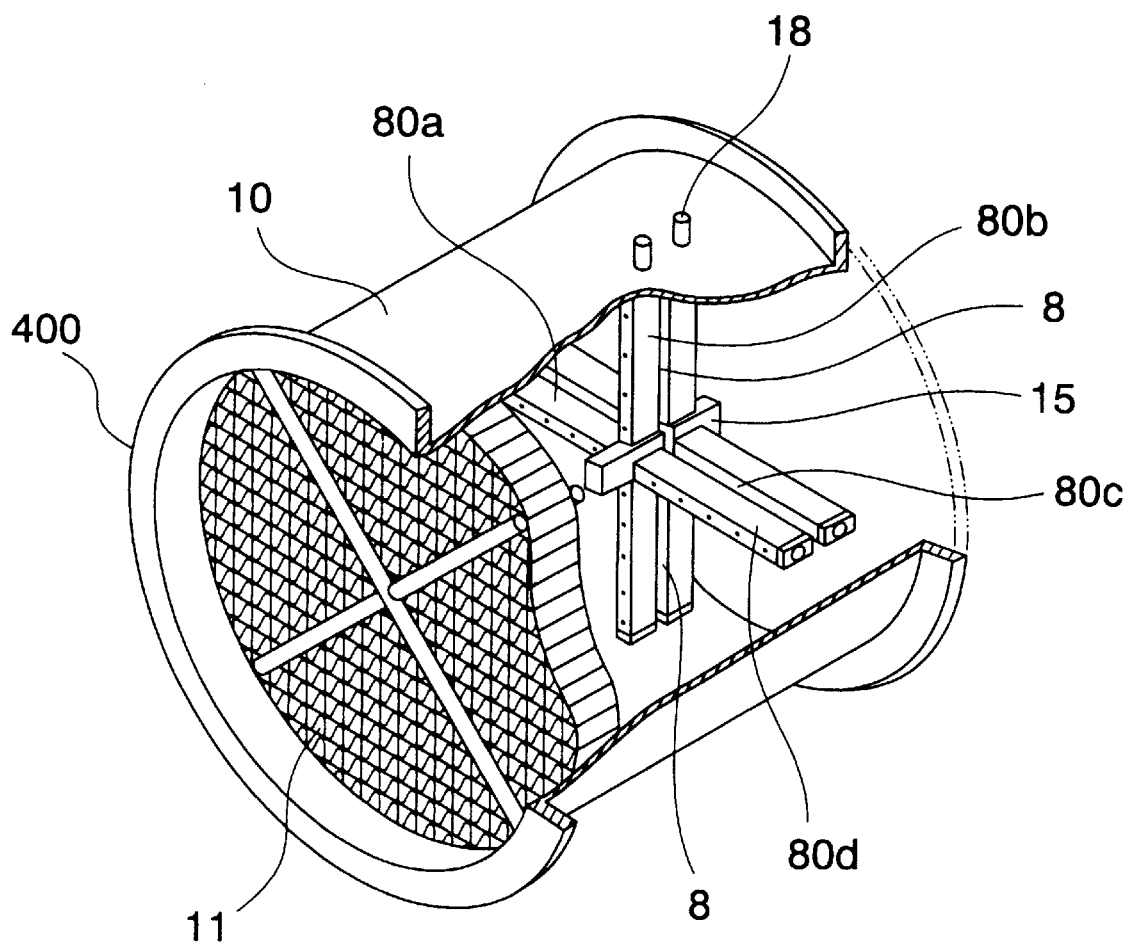
FIG. 14 is a partly-broken, perspective view of a fourth embodiment of an air flow rate measuring apparatus according to the invention.
Figure 15:
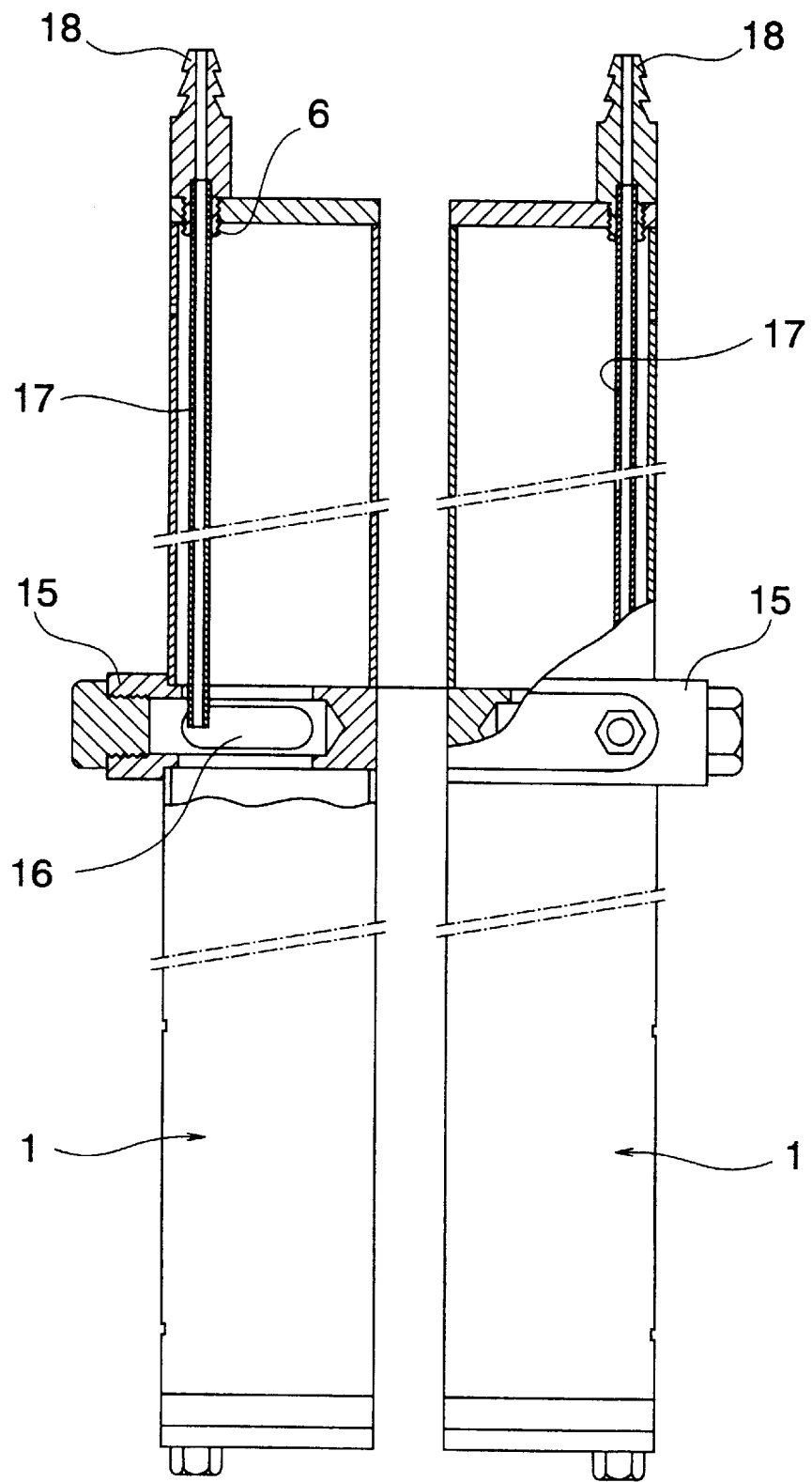
FIG. 15 is partly cross-sectional, side-elevational view of the fourth embodiment of a fluid pressure detector.

Next, an air flow rate measuring apparatus and a fluid pressure detector according to a fourth embodiment of the invention will be described with reference to FIGS. 14 and 15. This embodiment differs from the third embodiment in that a pair of tubular members 1 of each of differential pressure detector members 80a, 80b, 80c and 80d are disposed in parallel, closely spaced relation to each other, with a small gap 8 formed therebetween.

In the fluid pressure detector 80 in which the pair of tubular members 1 of each differential pressure detector member are disposed parallel to each other, with the gap 8 formed therebetween, the directivity in the flow direction can be reduced, and the yawing property for an angle of attack can be enhanced. In conjunction with the effect achieved by the fact that a flow rectifier 11 is provided upstream of the fluid pressure detector, the apparatus can be one in which an error is less liable to occur in the detected pressure even under conditions in which a considerable deflection flow is encountered, and the direction of the flow is not stable and not steady.

Figure 16:
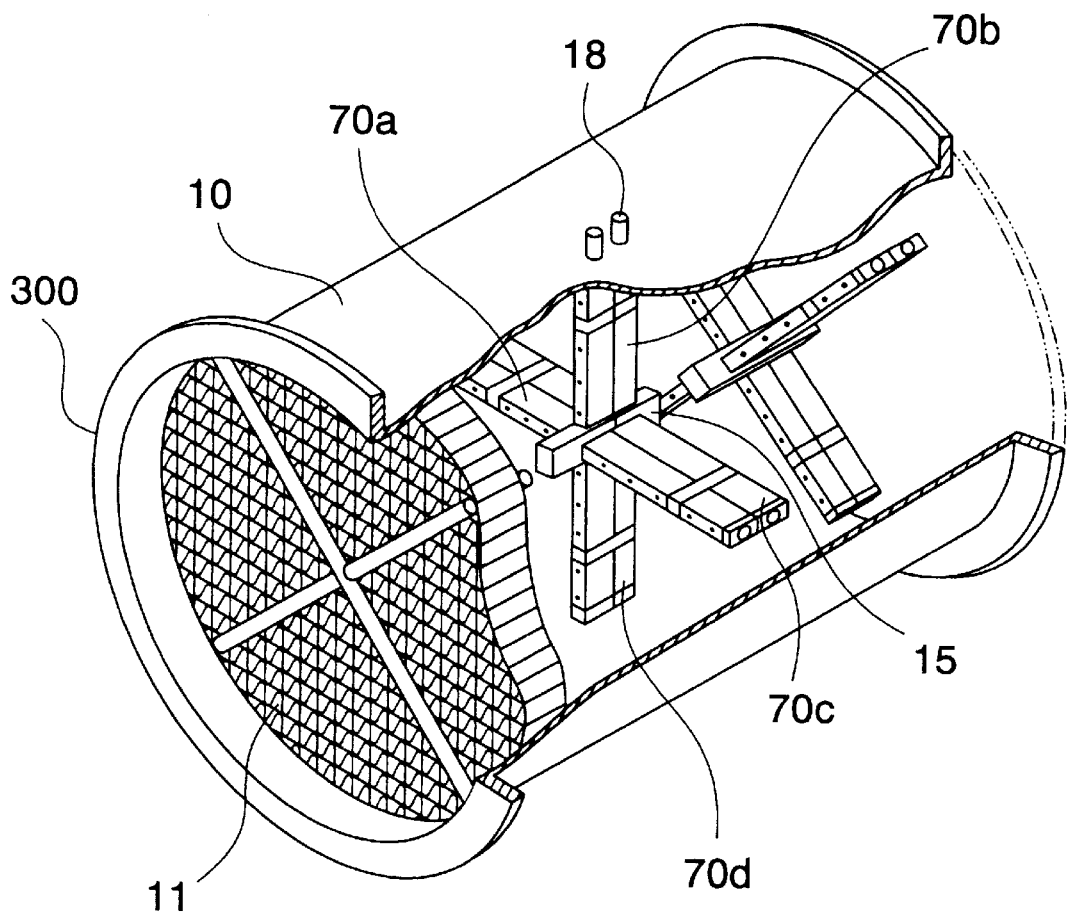
FIG. 16 is a partly-broken, perspective view of a fifth embodiment of an air flow rate measuring apparatus according to the invention.

FIG. 16 shows a fifth embodiment of an air flow rate measuring apparatus of the invention. In this fifth embodiment, a plurality of (two in the illustrated embodiment) fluid pressure detectors are provided within a casing 10, and are spaced from each other in a direction of flow of fluid to be measured, and each of the fluid pressure detectors is identical in construction to the fluid pressure detector 70 (see FIG. 10) of the third embodiment. The upstream-side and downstream-side fluid pressure detector are angularly shifted with respect to each other, so that they are not disposed in agreement with each other in the direction of flow of the fluid. This embodiment is effectively used in the air flow rate measuring apparatus including the round casing 10 having a large diameter. In a casing of a large diameter, the arrangement of pressure-measuring ports in a circumferential direction becomes sparser progressively from the axis of the casing toward the outer periphery thereof. In this embodiment, however, the plurality of fluid pressure detectors are spaced from each other in the direction of flow of the fluid, and by doing so, the number of the pressure-measuring ports can be easily increased, and the pressure-measuring ports can be arranged densely.

Figure 17:
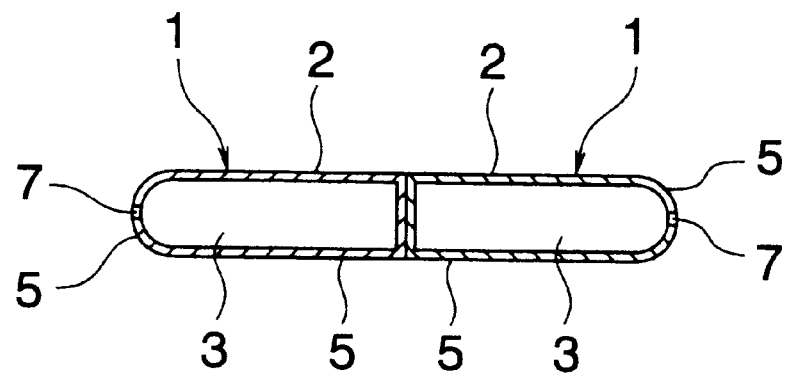
FIGS. 17 and 18 are cross-sectional views similar to FIG. 4, but showing modified tubular members of the fluid pressure detector of the invention, respectively.
Figure 18:
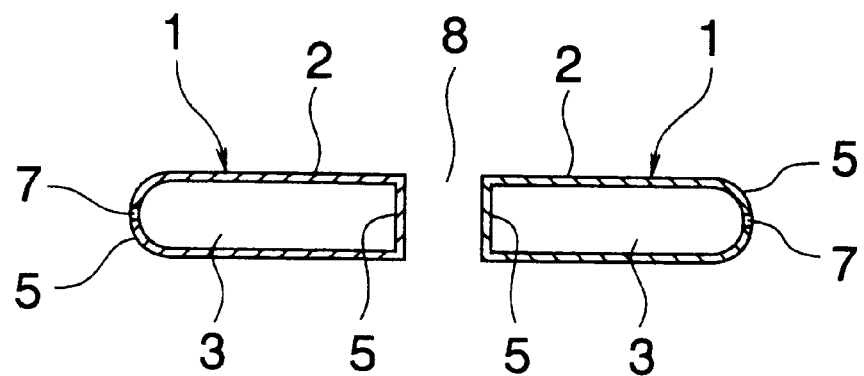

In the above embodiments, although the tubular member 1 has a generally rectangular transverse cross-section, that narrow side wall 5, having the pressure-measuring ports 7, may be rounded as shown in FIGS. 17 and 18. With this construction, an energy loss of the fluid to be measured can be reduced.

What is claimed is:

1. A fluid pressure detector comprising at least one differential pressure detector member;

said differential pressure detector member comprising:
  (a) a pair of tubular members of an identical configuration, each of said tubular members having a flattened shape having opposed narrow side walls and opposed wide side walls, and at least one pressure-measuring port being formed through one of said opposed narrow side walls; and
  (b) a pair of plug members mounted on and closing opposite open ends of each of said tubular members, respectively, one of said pair of plug members having a pressure outlet port;

wherein said pressure-measuring port in one of said pair of tubular members is directed toward an upstream side with respect to a direction of flow of fluid to be measured, thereby forming a total pressure-measuring port, while said pressure-measuring port in the other tubular member is directed toward a downstream side, thereby forming a static pressure-measuring port, and said pressure outlet port in said plug member, mounted on said one tubular member, serves as a total pressure outlet port while said pressure outlet port in said plug member, mounted on said other tubular member, serves as a static pressure outlet port.

2. A fluid pressure detector according to claim 1, in which said narrow side wall, having said pressure-measuring port is rounded.

3. A fluid pressure detector according to claim 1, in which said pair of tubular members are juxtaposed in contact with each other.

4. A fluid pressure detector according to claim 1, in which said pair of tubular members are juxtaposed in closely-spaced relation to each other.

5. A fluid pressure detector according to claim 3, in which said at least one differential pressure detector member comprises a plurality of differential pressure detector members juxtaposed in a direction substantially perpendicular to the direction of flow of the fluid, and said total pressure outlet ports, provided respectively in said plurality of differential pressure detector members, communicate with each other through a total pressure communication tube while said static pressure outlet ports, provided respectively in said plurality of differential pressure detector members, communicate with each other through a static pressure communication tube.

6. A fluid pressure detector according to claim 4, in which said at least one differential pressure detector member comprises a plurality of differential pressure detector members juxtaposed in a direction substantially perpendicular to the direction of flow of the fluid, and said total pressure outlet ports, provided respectively in said plurality of differential pressure detector members, communicate with each other through a total pressure communication tube while said static pressure outlet ports, provided respectively in said plurality of differential pressure detector members, communicate with each other through a static pressure communication tube.

7. A fluid pressure detector according to claim 3, in which said at least one differential pressure detector member comprises a plurality of differential pressure detector members arranged in a radial manner and disposed substantially perpendicular to the direction of flow of the fluid, and said total pressure outlet ports, provided respectively in said plurality of differential pressure detector members, communicate with each other through a total pressure communication tube provided at a center of said radial arrangement, while said static pressure outlet ports, provided respectively in said plurality of differential pressure detector members, communicate with each other through a static pressure communication tube provided at the center of said radial arrangement.

8. A fluid pressure detector according to claim 4, in which said at least one differential pressure detector member comprises a plurality of differential pressure detector members arranged in a radial manner and disposed substantially perpendicular to the direction of flow of the fluid, and said total pressure outlet ports, provided respectively in said plurality of differential pressure detector members, communicate with each other through a total pressure communication tube provided at a center of said radial arrangement, while said static pressure outlet ports, provided respectively in said plurality of differential pressure detector members, communicate with each other through a static pressure communication tube provided at the center of said radial arrangement.

9. An air flow-measuring apparatus comprising:

a casing having opposite open ends;
  a flow rectifier mounted within said casing at an upstream-side portion thereof with respect to a direction of flow of fluid to be measured; and
  at least one fluid pressure detector which is mounted within said casing, and is disposed downstream of said flow rectifier, said fluid pressure detector comprising at least one differential pressure detector member;

said differential pressure detector member comprising:
  (a) a pair of tubular members of an identical configuration, each of said tubular members having a flattened shape having opposed narrow side walls and opposed wide side walls, and at least one pressure-measuring port being formed through one of said opposed narrow side walls; and
  (b) a pair of plug members mounted on and closing opposite open ends of each of said tubular members, respectively, one of said pair of plug members having a pressure outlet port;

wherein said pressure-measuring port in one of said pair of tubular members is directed toward an upstream side with respect to a direction of flow of fluid to be measured, thereby forming a total pressure-measuring port, while said pressure-measuring port in the other tubular member is directed toward a downstream side, thereby forming a static pressure-measuring port, and said pressure outlet port in said plug member, mounted on said one tubular member, serves as a total pressure outlet port while said pressure outlet port in said plug member, mounted on said other tubular member, serves as a static pressure outlet port.

10. Apparatus according to claim 9, in which said narrow side wall of said fluid pressure detector, having said pressure-measuring port is rounded.

11. Apparatus according to claim 9, in which said pair of tubular members of said fluid pressure detector are juxtaposed in contact with each other.

12. Apparatus according to claim 9, in which said pair of tubular members of said fluid pressure detector are juxtaposed in closely-spaced relation to each other.

13. Apparatus according to claim 11, in which said at least one differential pressure detector member comprises a plurality of differential pressure detector members juxtaposed in a direction substantially perpendicular to the direction of flow of the fluid, and said total pressure outlet ports, provided respectively in said plurality of differential pressure detector members, communicate with each other through a total pressure communication tube while said static pressure outlet ports, provided respectively in said plurality of differential pressure detector members, communicate with each other through a static pressure communication tube.

14. Apparatus according to claim 12, in which said at least one differential pressure detector member comprises a plurality of differential pressure detector members juxtaposed in a direction substantially perpendicular to the direction of flow of the fluid, and said total pressure outlet ports, provided respectively in said plurality of differential pressure detector members, communicate with each other through a total pressure communication tube while said static pressure outlet ports, provided respectively in said plurality of differential pressure detector members, communicate with each other through a static pressure communication tube.

15. Apparatus according to claim 11, in which said at least one differential pressure detector member comprises a plurality of differential pressure detector members arranged in a radial manner and disposed substantially perpendicular to the direction of flow of the fluid, and said total pressure outlet ports, provided respectively in said plurality of differential pressure detector members, communicate with each other through a total pressure communication tube provided at a center of said radial arrangement, while said static pressure outlet ports, provided respectively in said plurality of differential pressure detector members, communicate with each other through a static pressure communication tube provided at the center of said radial arrangement.

16. Apparatus according to claim 12, in which said at least one differential pressure detector member comprises a plurality of differential pressure detector members arranged in a radial manner and disposed substantially perpendicular to the direction of flow of the fluid, and said total pressure outlet ports, provided respectively in said plurality of differential pressure detector members, communicate with each other through a total pressure communication tube provided at a center of said radial arrangement, while said static pressure outlet ports, provided respectively in said plurality of differential pressure detector members, communicate with each other through a static pressure communication tube provided at the center of said radial arrangement.

17. Apparatus according to claim 15, in which said at least one fluid pressure detector comprises a plurality of fluid pressure detectors arranged in the direction of flow of the fluid in such a manner that adjacent fluid pressure detectors are out of agreement with one another in the direction of flow of the fluid.

18. Apparatus according to claim 16, in which said at least one fluid pressure detector comprises a plurality of fluid pressure detectors arranged in the direction of flow of the fluid in such a manner that adjacent fluid pressure detectors are out of agreement with one another in the direction of flow of the fluid.

19. A fluid pressure detector comprising:
at least one differential pressure detector member that comprises:
(a) a pair of tubular members having opposite ends, each tubular member having a flattened shape possessing oppositely facing narrow side walls and oppositely facing wide side walls that are wider than said narrow side walls, one of the tubular members including at least one total pressure measuring port provided in one of said narrow side walls and directed toward an upstream side with respect to a direction of flow of fluid to be measured, the other tubular member including at least one static pressure-measuring port provided in one of said narrow side walls and directed toward a downstream side with respect to the direction of flow of the fluid to be measured; and
(b) closing members closing the opposite ends of each of said tubular members, one of said closing members on said one tubular member being provided with a total pressure outlet port and one of the closing members on said other tubular member being provided with a static pressure outlet port.

20. A fluid pressure detector according to claim 19, wherein said at least one differential pressure detector member comprises a plurality of differential pressure detector members juxtaposed in a direction substantially perpendicular to the direction of flow of the fluid.

21. A fluid pressure detector according to claim 1, wherein said wide side walls of each tubular member are arranged substantially parallel to the direction of flow of the fluid to be measured.

22. Apparatus according to claim 9, wherein said wide side walls of each tubular member are arranged substantially parallel to the direction of flow of the fluid to be measured.

23. A fluid pressure detector according to claim 19, wherein said wide side walls of each tubular member are arranged substantially parallel to the direction of flow of the fluid to be measured.

* * * * *